United States Patent
Glover et al.

(10) Patent No.: US 8,747,768 B2
(45) Date of Patent: *Jun. 10, 2014

(54) SCREENLESS INTERNALS FOR RADIAL FLOW REACTORS

(75) Inventors: Bryan K. Glover, Algonquin, IL (US); Guy B. Woodle, Mount Prospect, IL (US); Joseph E. Zimmermann, Arlington Heights, IL (US); John J. Senetar, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 870 days.

This patent is subject to a terminal disclaimer.

(21) Appl. No.: 12/711,278

(22) Filed: Feb. 24, 2010

(65) Prior Publication Data

US 2010/0158765 A1  Jun. 24, 2010

Related U.S. Application Data

(63) Continuation of application No. 11/458,402, filed on Jul. 19, 2006, now Pat. No. 7,695,696.

(51) Int. Cl.
*B01J 8/12* (2006.01)

(52) U.S. Cl.
USPC ........... 422/216; 422/220; 422/311; 208/165; 208/168; 96/150; 96/152; 34/174

(58) Field of Classification Search
USPC ........... 422/216, 218, 220, 311; 208/165, 168
See application file for complete search history.

(56) References Cited

U.S. PATENT DOCUMENTS

| | | | |
|---|---|---|---|
| 170,894 A * | 12/1875 | Perkins ........................... 34/174 |
| 633,221 A | 9/1899 | Sorlle et al. |
| 638,429 A | 12/1899 | Tweedale et al. |
| 691,209 A | 1/1902 | Tweedale et al. |
| 2,265,837 A * | 12/1941 | Harding ........................ 208/176 |
| 3,818,667 A | 6/1974 | Wagner |
| 4,120,644 A * | 10/1978 | Numasaki et al. .............. 432/99 |
| 4,349,362 A | 9/1982 | Tanaka et al. |
| 4,539,917 A * | 9/1985 | Mallon et al. .................. 110/256 |
| 4,880,604 A | 11/1989 | Koves |
| 4,880,608 A | 11/1989 | Stelman |
| 5,165,900 A | 11/1992 | Miksitz |
| 5,356,462 A * | 10/1994 | Bruggendick .................. 96/150 |
| 5,472,928 A | 12/1995 | Scheuerman et al. |
| 5,827,485 A * | 10/1998 | Libal et al. .................... 422/179 |
| 7,621,988 B1 | 11/2009 | Sun et al. |
| 7,622,089 B1 | 11/2009 | Glover |
| 7,695,696 B2 | 4/2010 | Glover et al. |
| 2002/0065442 A1 | 5/2002 | Williams et al. |
| 2009/0238729 A1 | 9/2009 | Glover |
| 2010/0055008 A1 | 3/2010 | Glover et al. |

FOREIGN PATENT DOCUMENTS

| | | | |
|---|---|---|---|
| EP | 0351665 A1 | 1/1990 |
| JP | 52082676 A * | 7/1977 |
| JP | 53146261 A | 12/1978 |
| JP | 56087426 A | 7/1981 |
| JP | 2035913 A | 2/1990 |

* cited by examiner

*Primary Examiner* — Jennifer A Leung

(74) *Attorney, Agent, or Firm* — Mark R. Willis

(57) ABSTRACT

An apparatus for contacting a bed of particulate material with a cross flowing fluid, which maintains the bed of particulate material within a retention volume. The apparatus includes partitions for retaining particles, with apertures disposed within the partitions. The apertures are covered by louvers that extend above the edges of the apertures to prevent solid particles from spilling through inlet apertures.

20 Claims, 4 Drawing Sheets

US 8,747,768 B2

SCREENLESS INTERNALS FOR RADIAL FLOW REACTORS

CROSS-REFERENCE TO RELATED APPLICATION

This application is a Continuation of application Ser. No. 11/458,402 filed Jul. 19, 2006, now U.S. Pat. No. 7,695,696 B2, the contents of which are hereby incorporated by reference in its entirety.

FIELD OF THE INVENTION

This invention relates to the field of fluid particle contact and to an apparatus for contacting fluids and particles. More specifically, this invention relates to a moving bed of particles with a cross-flowing fluid.

BACKGROUND OF THE INVENTION

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes used to hold the catalyst particles within a bed are sized to have apertures sufficiently small that the particles cannot pass through. A significant problem is the corrosion of meshes or screens used to hold catalyst beds in place, or for the distribution of reactants through a reactor bed. Corrosion can plug apertures to a screen or mesh, creating dead volumes where fluid does not flow. Corrosion can also create larger apertures where the catalyst particles can then flow out of the catalyst bed with the fluid and be lost to the process increasing costs. This produces unacceptable losses of catalyst, and increases costs because of the need to add additional makeup catalyst.

The design of reactors to overcome these limitations can save significantly on downtime for repairs and on the loss of catalyst, which is a significant portion of the cost of processing hydrocarbons.

SUMMARY OF THE INVENTION

A solution to the above problem is to design a catalyst retention apparatus wherein the fluid is allowed to freely flow across the catalyst bed, while the catalyst is maintained in a catalyst retention volume. The invention is an apparatus for supporting a granular solid. The apparatus comprises an inlet partition having apertures for allowing gas to flow in, and an outlet partition having apertures for allowing gas to flow out, where the inlet and outlet partitions define a volume for holding a granular solid. The apparatus further comprises at least one inlet louver, where the louver is positioned over an inlet aperture and extends into the volume for holding the solid. The louver extends downward and covers the inlet aperture to prevent solid from passing through the inlet aperture. The louver has an upper edge and a lower edge, and the inlet aperture has an upper edge and a lower edge, where the louver upper edge is affixed to the inlet partition at a position where the louver upper edge is at least as high as the inlet aperture upper edge and the louver lower edge extends into the volume for holding the solid and is at least as low as the inlet aperture lower edge. The louver extends away from the inlet partition at an angle between about 1 degree and about 85 degrees.

Other objects, advantages and applications of the present invention will become apparent to those skilled in the art from the following drawings and detailed description.

DETAILED DESCRIPTION OF THE INVENTION

A problem exists with radial flow reactors where a catalyst flows down an annular region, and the annular region is defined by an inner screened partition and an outer screened partition, which defines the catalyst bed, or a particle retention volume for holding a granular solid. A fluid, usually a gas, flows across the partitions and catalyst bed, reacting with the catalyst to produce a product fluid, also usually a gas. The reactor holds the catalyst in with screens where the gas flows through. The screened partitions need holes sufficiently small to prevent catalyst particles from passing, but the holes are subject to plugging and creating dead spaces where the gas doesn't flow, as well as the partitions are subject to erosion and corrosion, creating holes that allow for catalyst to spill out.

The apparatus can also be an adsorber for adsorbing a constituent from the fluid flowing over a granular solid adsorbent. This includes an apparatus where the adsorbent is loaded and does not flow through the adsorber, but is held in place by the inlet and outlet partitions while fluid flows over the granular adsorbent. The apparatus of the present invention is oriented for the downward, or in the direction of gravity, flow of a solid through the apparatus with the cross flow of a gas, and accordingly, the use of the terms downward and upward are in reference to directions relative to the direction of gravity.

Figure 1:
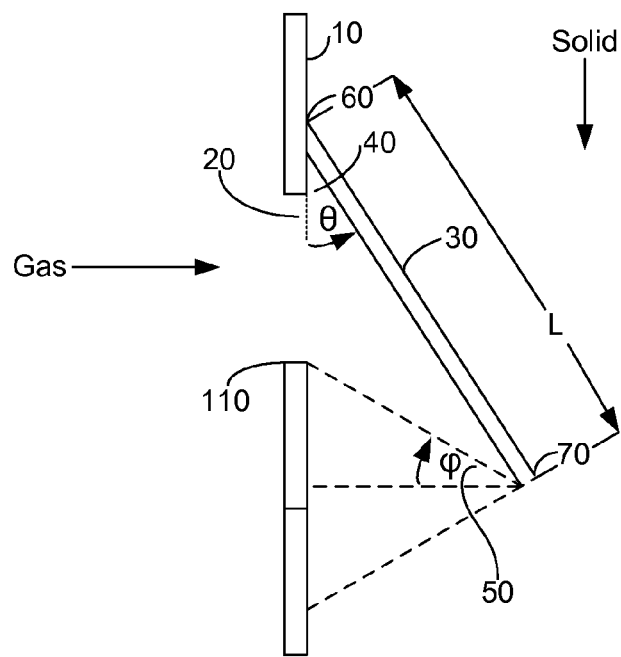
FIG. 1 is a drawing of a portion of an inlet partition for the apparatus.

The retrofitting of existing radial flow reactors provides for a method of improving the reactors by using a screenless inlet partition. A section of the inlet partition is shown in FIG. 1, where the invention is described relative to the inlet partition 10 with one of the apertures 20, and a louver 30 covering the aperture 20. The louver 30 has a length, L, and extends into the particle retention area at an angle θ, designated by the number 40. The louver 30 projects into the particle retention area at a distance of $L*\sin(\theta)$, and extends downward along the direction of the inlet partition to a distance $L*\cos(\theta)$. The apertures have a lower edge 110, and the louvers have a lower edge 70, where the louver lower edge 70 extends to at least the aperture lower edge 110, along the inlet partition.

During the filling process of the reactor, the solid fills the particle retention space, and some of the solids flow up into the void volume created between the inlet partition 10 and the louvers 30. The backfilling of this volume can create a loss of catalyst if the catalyst is allowed to flow through the inlet aperture 20. Avoiding the loss of catalyst results in significant savings as catalyst is one of the most significant costs in a petroleum refinery. The spilling of catalyst through the aperture 20 is avoided if the lower edge of the aperture is at a height above the lower edge of the louver by a distance determined by the angle of repose, φ, of the granular catalyst. The angle of repose, designated by the number 50, is a property of particulate solids. When bulk particles are poured onto a horizontal surface, a conical pile will form, and the angle between the edge of the pile and the horizontal surface is known as the angle of repose. The angle is related to physical properties of the material, such as particle size and shape, density, and the coefficient of friction of the particles.

Preferably, the distance, or height, of the aperture lower edge above the louver lower edge is determined according to the equation, as follows:

$$d=L*\sin(\theta)*\tan(\phi),$$

where L is the length of the louver, θ is the angle the louver extends away from the inlet partition, and φ is the angle of repose for the granular solid. The length of the louver, L, is the length from the upper edge 60 of the louver attached to the inlet partition 10 spanning to the lower edge 70 of the louver extending into the particle retention volume.

The angle 40, θ, is between about 10 and about 50 degrees from the vertical and preferably is between about 15 and about 35 degrees, with a more preferred angle between about 15 and about 25 degrees. The angle of the louver is preferably chosen to provide the same or greater contact area between the inlet gas and the surface of the bed of granular solid exposed under the louver, as the surface area of a screened aperture.

The angle 40 of the louvers 30 is chosen to minimize holdup of the granular solid as the solid flows through the apparatus. It has been found that the uppermost louver preferably is of a steeper angle than successive louvers lower in the apparatus. The uppermost louver preferably should be oriented at an angle from vertical between about 1 degree and about 20 degrees.

The apertures 20 can be round holes, or can be slots having a generally horizontal orientation, or any size or shaped opening that fits under the louver subject to having the aperture lower edge 110 above the louver lower edge by a distance as determined by equation 1. For the case of an aperture with a non-straight lower edge, the lower edge reference is the lowest point along the lower edge of the aperture.

In one embodiment, the louvers 30 extend the width of the inlet partition 10, or in the case of a radial reactor, the louvers 30 encircle the inlet partition 10, or form a ring that is affixed to the cylindrical inlet partition 10 and each louver 30 covers a plurality of apertures 20. For long louvers, the apertures 20 can be elongated slots having a generally horizontal orientation.

Figure 2:
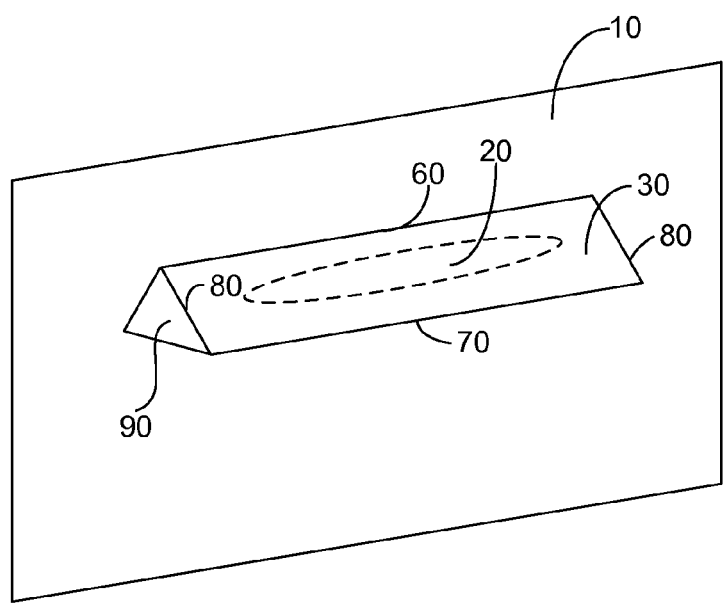
FIG. 2 is a drawing of a louver including the extensions.

In another embodiment, the louvers 30 do not extend the width of the inlet partition, but extend over the apertures, and further include extensions, as shown in FIG. 2. The louvers have side edges 80, and the extensions 90 extend from the side edges 80 of the louvers 30 to the inlet partition 10, effectively forming a shroud over the aperture 20.

Figure 3:
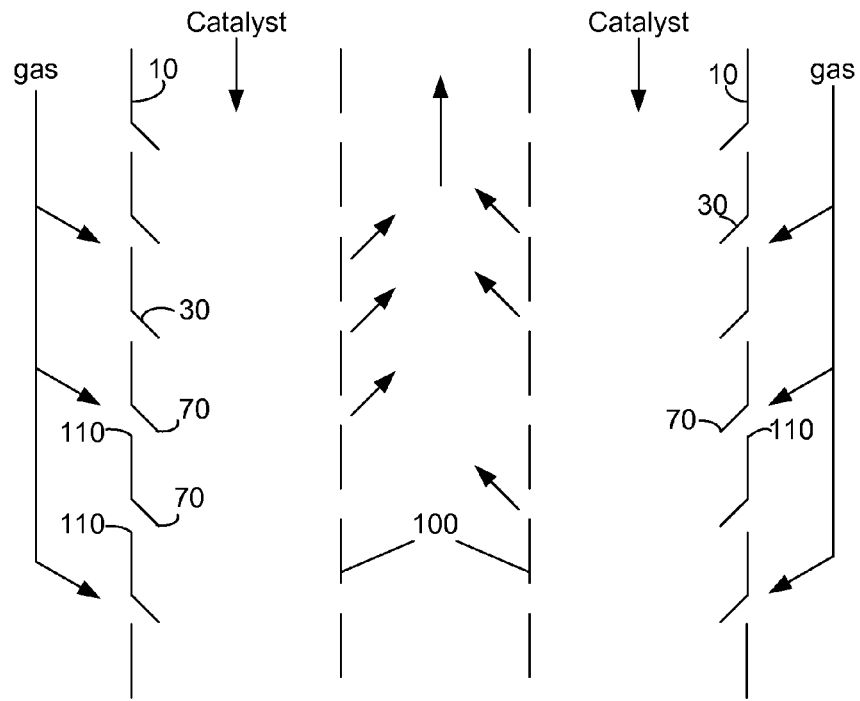
FIG. 3 is a vertical cross section of a radial flow reactor with the inlet partition incorporating the invention.
Figure 4:
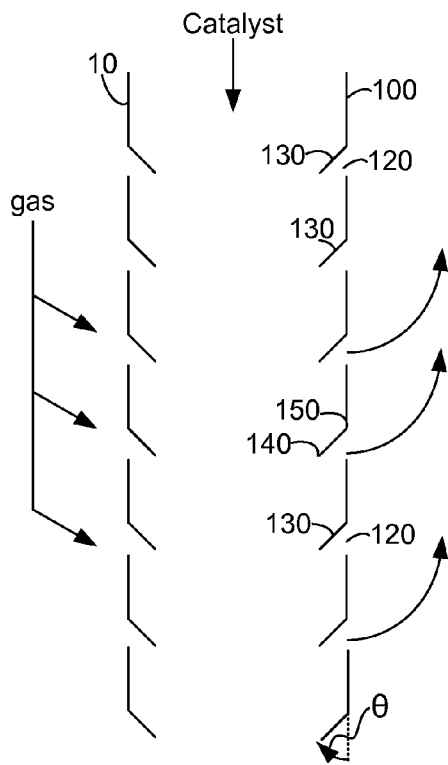
FIG. 4 is a vertical cross section of a second embodiment of a radial flow reactor with catalyst containment.

In a radial flow reactor, the reactor comprises an inner surface and an outer surface with the catalyst disposed between the inner and outer surface forming a cylindrical structure. Depending on desired flow characteristics, the inner surface can be the inlet partition, with the outer surface as the outlet partition. In an alternative, the outer surface can be the inlet partition and the inner surface can be the outlet partition. Characteristics that would dictate the choice include, but are not limited to, the flow rate of the fluid, including whether the fluid expands or contracts due to increasing or decreasing the number of moles of chemicals within the fluid, as well as temperature changes in the fluid. A vertical cross-section of a radial flow reactor is shown in FIG. 3, where the outer surface is the inlet partition 10 and the inner surface is the outlet partition 100. The gas flows through the inlet partition 10 as the catalyst flows down the reactor in the particle retention volume. The louvers 30 extend into the particle retention volume, with the lower edge 70 of the louvers extending below the lower edge 110 of an inlet aperture. The outlet partition 100 can be screened for retaining catalyst particles with the screens having holes sized to prevent the passage of solid granular particles from the particle retention volume, or can have a screenless louvered system similar to the inlet partition 10, as described above and shown in FIG. 4, wherein the outlet partition 100 has apertures 120 defined therein, and where the apertures 120 are covered by louvers 130 that extend in a downward direction into the particle retention volume. In one variation, the outlet partition can be made entirely of a screen with the screened holes sized sufficiently small to prevent the passage of catalyst. The outlet louvers 130 have a lower edge 140 and an upper edge 150, where the upper edge 150 is affixed to the outlet partition 100 above a covered outlet aperture 120. The lower edge 140 of the outlet louvers extends to a distance below the lowest edge of the outlet aperture by the distance, d as defined above, where the louver 130 extends at an angle, θ, from the vertical and the granular solid has an angle of repose, φ. The angle of the outlet louvers 130 is between about 10 degrees and about 50 degrees, with a preferred angle between about 15 degrees and about 35 degrees. The angle for the uppermost outlet louver 130 can be between about 1 degree and about 20 degrees.

For reactors that have high fluid cross flow rates, the outlet louver edge preferably extends to a distance below the lower edge of the outlet partition aperture greater than the distance the lower edge of the inlet louver extends below the lower edge of the inlet partition aperture.

While the preferred embodiment is for a radial flow reactor, the invention is also applicable to a reactor, or adsorber, wherein the inlet partition and outlet partition are substantially parallel planar structures.

Figure 5:
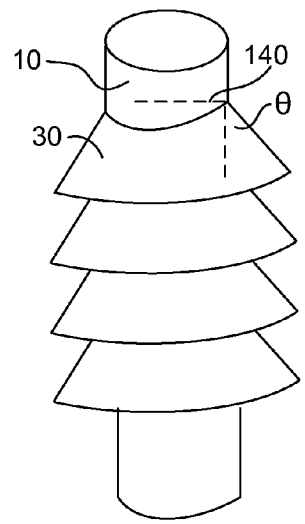
FIG. 5 is an embodiment of a spiral louver around an inner inlet partition of a radial flow reactor.

The present invention provides for many possible designs. One such embodiment is a radial flow reactor with the inlet partition on the inside of the reactor. The inlet partition 10 forms a substantially cylindrical structure, and the louvers 30 are disposed in a spiral arrangement about the inlet partition on the particle retention volume side of the inlet partition. The louvers are affixed to the inner partition 10 and wind in a spiral manner about the inner partition 10 where the angle of declination 140 between about 0.5 degrees and about 10 degrees, as shown in FIG. 5. A louver 30 can comprise a single winding about the inlet partition 10, or can comprise multiple windings, with the limit of having a single louver 30 wound around the inlet partition 10.

The present invention also provides for a variable angle, $\theta$, of the louvers with respect to the inlet partition 10. The angle that the louver 30 forms with respect to the inlet partition 10 can, optionally, vary with position down the length of the reactor inlet partition 10. It is preferred that the uppermost angle be the smallest providing the steepest slope of a louver 30 on the inlet partition, with louvers 30 in lower positions relative to the uppermost louver 30 having larger angles. The angles can increase gradually, or can increase once and remain at that angle down the length of the inlet partition 10. This is also true for the design having one or more spiral louvers, where in the case of a single spiral louver 30, the louver 30 has an initial angle that is small, and the angle of the louver 30 increases with each spiral winding about the inlet partition 10. The angle, $\theta$, can vary from about 1 degree to about 50 degrees.

The apparatus of the present invention further can include a fluid inlet at the top of the reactor for facilitating the downward flow of granular solid particles in the particle retention volume.

Figure 6:
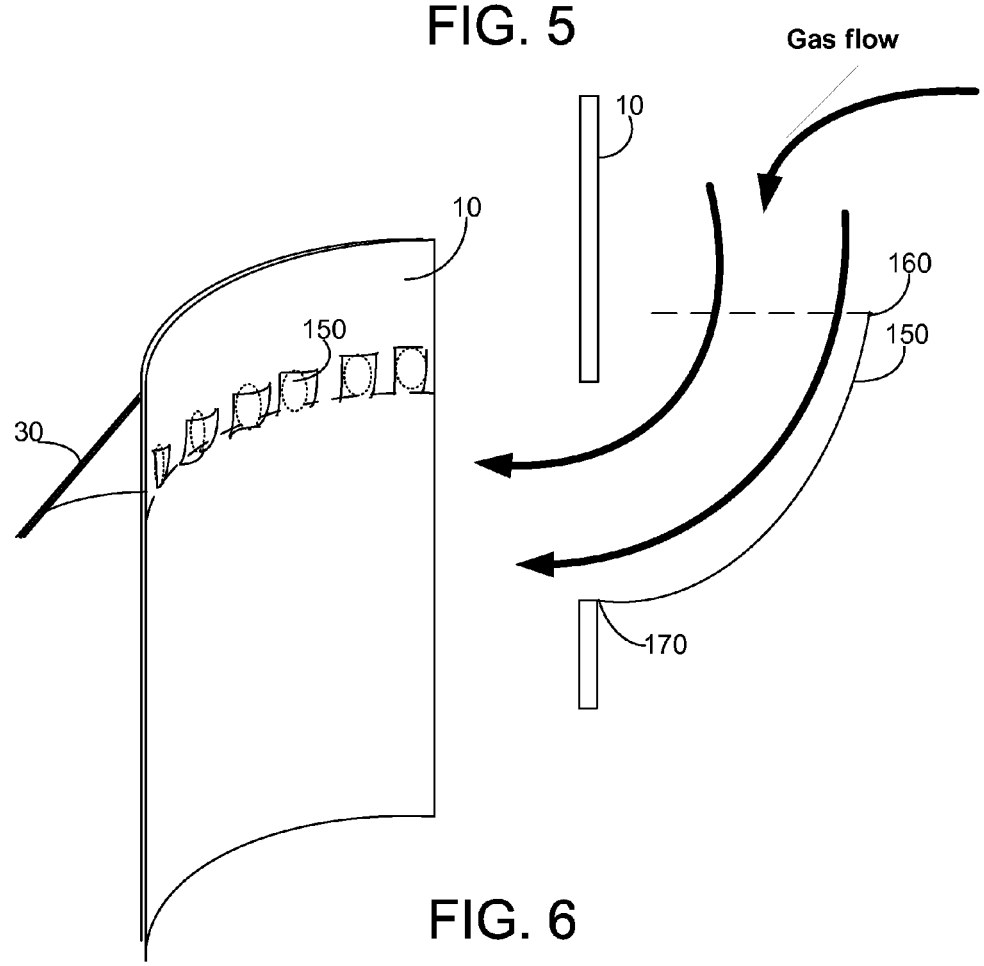
FIG. 6 shows the use of inlet vanes on the apparatus.

Another embodiment of the invention incorporates inlet vanes, as shown in FIG. 6. The inlet vanes 150 are disposed on the inlet partition 10, on the gas side and away from the particle retention volume side. The inlet vanes 150 have an upper edge 160 and a lower edge 170, and are affixed to the inlet partition 10 with the inlet vanes lower edges 170 affixed below the lower edge 110 of the apertures on the inlet partition 10. The angle of the inlet vanes 150 with respect to the inlet partition 10 is between about 10 degrees and about 50 degrees. The inlet vanes 150 can have a variety of configurations, including but not limited to a louvered shape and can be extended across a plurality of inlet apertures, or a rounded shape where each inlet aperture has an inlet vane.

Figure 7:
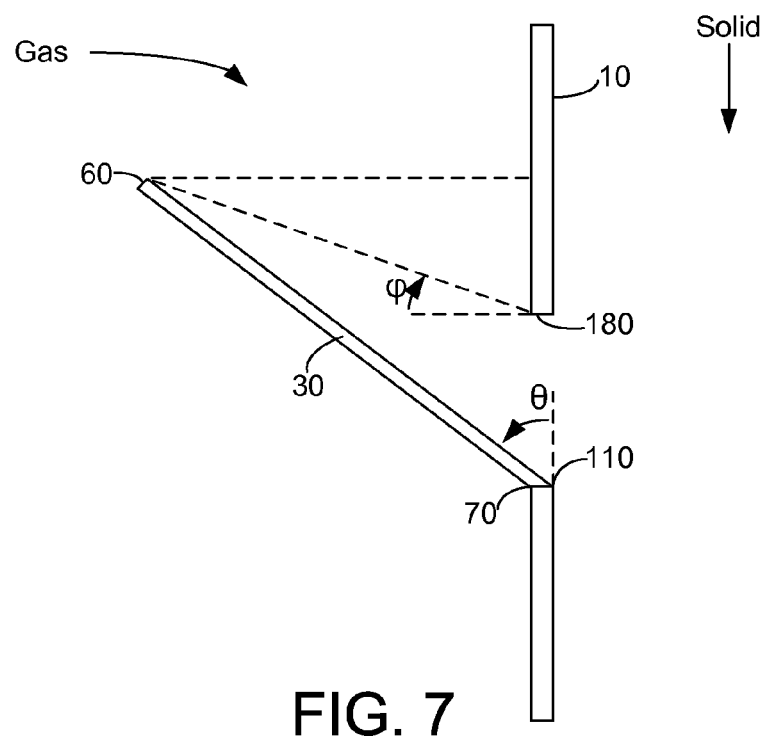
FIG. 7 is a drawing of a portion of an inlet partition for the apparatus with the louvers extending outward and away from the particle retention volume.

In an alternate embodiment, the apparatus comprises an inlet partition 10 having apertures 20 defined therein, and an outlet partition 100 having apertures defined therein, where the inlet and outlet partition define a particle retention volume between the partitions for holding a granular solid, and where each inlet aperture 20 has an upper edge 180 and a lower edge 110. A portion of the inlet partition 10 of the apparatus of this embodiment is shown in FIG. 7. The apparatus further comprises at least one inlet louver 30, where each louver has an upper edge 60 and a lower edge 70. Each inlet aperture has a louver 30 affixed to the inlet partition 10, where the louver lower edge 70 is affixed to the inlet partition 10 at the lower edge 110 of the inlet aperture 20, and extends away from the particle retention volume space at an angle, $\theta$, between about 1 degree and about 85 degrees, and the louver upper edge 60 extends to a distance, d, above the aperture upper edge 180 according to equation (1) above, where L is the length of the louver, $\theta$ is the angle the louver extends away from the inlet partition, and $\phi$ is the angle of repose for the granular solid.

In an alternate embodiment, the apertures have side edges, and the louvers 30 have side edges. The louvers 30 include a pair of extensions wherein the extensions are affixed to the louver side edges, and the extensions span the space between the inlet partition and the louvers. Each extension is affixed to an aperture side edge to close the side gap between the louver and the inlet partition. The extensions provide a further means for preventing catalyst from spilling out of the reactor.

The louvers 30 preferably extend away from the inlet partition 10 at an angle between about 10 degrees and about 50 degrees, with a more preferred angle between about 15 degrees and about 35 degrees. In order to facilitate the flow of the granular solid through the apparatus, it is preferred that the uppermost louver 30 extend away from the inlet partition 10 at an angle between about 1 degree and about 20 degrees.

Figure 8:
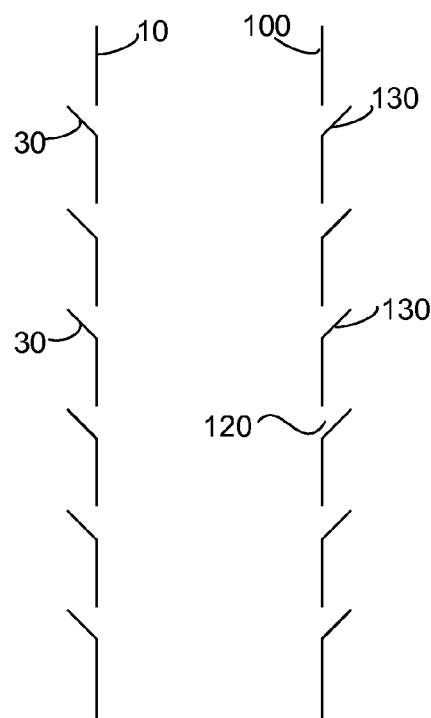
FIG. 8 is a vertical cross section of the apparatus wherein the louvers extend outward from the particle retention volume.

As with the first embodiment, in this embodiment, the outlet partition 100 can comprise screened apertures wherein the screen has openings sufficiently small to prevent the passage of the solid granular particles that are flowing through the apparatus. In an alternative, the apparatus can comprise an inlet partition 10 and an outlet partition 100 as shown in FIG. 8, wherein the inlet partition 10 comprises apertures defined therein and has louvers 30 affixed to the inlet partition 10 at the lower edge of the inlet apertures, and wherein the outlet partition 100 comprises apertures defined therein and has louvers 130 affixed to the outlet partition 100 at the lower edge of the outlet apertures. In this embodiment, the louvers 30, 130 extend outward from the particle retention volume.

The present invention comprises optional designs and possibilities. One such design that is possible under this invention is the use of conical shaped sections or pyramidal shaped sections for covering the inlet apertures 20, wherein the conical sections are affixed to the inlet partition 10 with the apex of the conic section pointing in the upward direction, and the lower edge of the conic section extending to a distance below the lower edge of the aperture, as described above. In the context of this invention, upward is the direction opposing gravity.

Optionally, modifications can be made to the louvers for purposes of redirecting gas flow, and further contributing to the prevention of solid particle spillage through apertures in the partitions. One such modification includes the addition of baffles. The baffles are affixed to the underside of the louvers, and project substantially perpendicularly from the louvers into the gas stream, but above the lower edge of the louvers. Preferably, the baffles are disposed on the louvers at a position between about 10% and about 90% of the length from the louver upper edge to the louver lower edge. Additionally, baffles can be added to the inlet partition, where the baffles on the inlet partition are positioned beneath the louvers and below the inlet apertures, but above the position where the granular solid contacts the inlet partition. The baffles on the inlet partition will, in general, be above the lower edge of the louvers. The baffles can further include a screen positioned above the surface of the catalyst for redistributing gas flow to the catalyst bed.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An apparatus for supporting a granular solid in a cross-flow system, comprising:
   A) an inner surface forming a cylindrical structure and being an inlet partition having inlet apertures defined therein, wherein each inlet aperture has a lower edge and an upper edge; and
   B) a plurality of inlet louvers arranged vertically on the inlet partition, wherein each inlet louver has an upper edge and a lower edge, and each inlet louver upper edge is attached to the inlet partition at a position above an inlet aperture and extends into a particle retention volume at an angle, θ, of about 1 to about 85 degrees and each inlet louver lower edge extends to at least the lower edge of the inlet aperture; wherein each inlet louver, independently, encircles the inlet partition; and C) an outer surface forming a cylindrical structure, being an outlet partition, and not having a louver arranged on the outlet partition and wherein said apparatus further comprises inlet vanes, where the inlet partition has a particle side and a gas side, and where the inlet vanes have an upper edge and a lower edge, and where the inlet vane lower edges are affixed to the inlet partition on the gas side at the inlet partition aperture lower edges.

2. The apparatus of claim 1, wherein the apparatus is a radial flow reactor.

3. The apparatus of claim 1, further comprising an additional fluid inlet at a top of the apparatus, for admitting additional fluid to facilitate a downward flow of the granular solid.

4. The apparatus of claim 1, wherein the granular solid is a catalyst, and the apparatus is a reactor.

5. The apparatus of claim 1, wherein the granular solid is an adsorbent, and the apparatus is an adsorption unit.

6. The apparatus of claim 1, wherein the angle, θ, for the plurality of inlet louvers is at an angle from vertical of about 10 to about 50 degrees.

7. The apparatus of claim 1, wherein the plurality of inlet louvers is at an angle from vertical between about 15 to about 35 degrees.

8. The apparatus of claim 1, wherein uppermost inlet louvers are disposed at an angle from vertical of between about 1 to about 20 degrees.

9. The apparatus of claim 1, wherein the outlet partition has screens covering outlet partition apertures.

10. The apparatus of claim 1, wherein the inlet apertures are elongated, horizontally oriented slots.

11. An apparatus for supporting a granular solid in a cross-flow system, comprising:
A) an outer surface forming a cylindrical structure and being an inlet partition having inlet apertures defined therein, wherein each inlet aperture has a lower edge and an upper edge; and
B) a plurality of inlet louvers arranged vertically on the inlet partition, wherein each inlet louver has an upper edge and a lower edge, and each inlet louver upper edge is attached to the inlet partition at a position above an inlet aperture and extends into a particle retention volume at an angle, θ, of about 1 to about 85 degrees and each inlet louver lower edge extends to at least the lower edge of the inlet aperture; wherein each inlet louver, independently, encircles an inner circumference of the inlet partition; and
C) an inner surface forming a cylindrical structure, being an outlet partition, and not having a louver arranged on the outlet partition and wherein said apparatus further comprises inlet vanes, where the inlet partition has a particle side and a gas side, and where the inlet vanes have an upper edge and a lower edge, and where the inlet vane lower edges are affixed to the inlet partition on the gas side at the inlet partition aperture lower edges.

12. The apparatus of claim 11, wherein the apparatus is a radial flow reactor.

13. The apparatus of claim 11, further comprising an additional fluid inlet at a top of the apparatus, for admitting additional fluid to facilitate a downward flow of the granular solid.

14. The apparatus of claim 11, wherein the granular solid is a catalyst, and the apparatus is a reactor.

15. The apparatus of claim 11, wherein the granular solid is an adsorbent, and the apparatus is an adsorption unit.

16. The apparatus of claim 11, wherein the angle, θ, for the plurality of inlet louvers are at an angle from vertical of about 10 to about 50 degrees.

17. The apparatus of claim 11, wherein the outlet partition has screens covering outlet partition apertures.

18. The apparatus of claim 11, wherein the inlet apertures are elongated, horizontally oriented slots.

19. A process for supporting a granular solid in a cross-flow system, comprising:
A) providing an inner surface forming a cylindrical structure and being an inlet partition having apertures defined therein wherein each inlet aperture has a lower edge and an upper edge;
B) passing an incoming fluid through one or more apertures defined by the inlet partition;
C) providing a plurality of inlet louvers, wherein each inlet louver has an upper edge and a lower edge, and the inlet louver upper edge is attached to the inlet partition at a position above an inlet aperture and extends into a particle retention volume at an angle, θ, of about 1 to about 85 degrees and the inlet louver lower edge extends to at least the lower edge of the inlet aperture; wherein each inlet louver, independently, encircles an inner circumference of the inlet partition;
D) providing an outer surface forming a cylindrical structure, being an outlet partition and having apertures defined therein, and not having a louver arranged on the outlet partition, and wherein the inlet partition and the outlet partition are spaced to define a particle retention volume for holding the granular solid;
E) providing inlet vanes, where the inlet partition has a particle side and a gas side, and where the inlet vanes have an upper edge and a lower edge, and where the inlet vane lower edges are affixed to the inlet partition on the gas side at the inlet partition aperture lower edges; and
F) passing an outgoing fluid through one or more apertures defined by the outlet partition.

20. A process for supporting a granular solid in a cross-flow system, comprising:
A) providing an outer surface forming a cylindrical structure and being an inlet partition having apertures defined therein wherein each inlet aperture has a lower edge and an upper edge;
B) passing an incoming fluid through one or more apertures defined by the inlet partition;
C) providing a plurality of inlet louvers, wherein each inlet louver has an upper edge and a lower edge, and each inlet louver upper edge is attached to the inlet partition at a position above an inlet aperture and extends into a particle retention volume at an angle, θ, of about 1 to about 85 degrees and the each inlet louver lower edge extends to at least the lower edge of the inlet aperture; wherein each inlet louver, independently, encircles an inner circumference of the inlet partition;
D) providing an inner surface forming a cylindrical structure, being an outlet partition and having apertures defined therein and the outlet partition not having a louver arranged on the outlet partition, and wherein the inlet partition and the outlet partition are spaced to define a particle retention volume for holding the granular solid;
E) providing inlet vanes, where the inlet partition has a particle side and a gas side, and where the inlet vanes have an upper edge and a lower edge, and where the inlet vane lower edges are affixed to the inlet partition on the gas side at the inlet partition aperture lower edges; and E) passing an outgoing fluid through one or more apertures defined by the outlet partition.

\* \* \* \* \*